US010221967B2

(12) United States Patent
Kingston et al.

(10) Patent No.: US 10,221,967 B2
(45) Date of Patent: Mar. 5, 2019

(54) CLAMP FOR A FLEXIBLE PIPE

(71) Applicant: MATRIX COMPOSITES & ENGINEERING LTD., Henderson, Western Australia (AU)

(72) Inventors: James Francis William Kingston, Henderson (AU); Lee McDermott, Henderson (AU)

(73) Assignee: Matrix Composites and Engineering LTD., Henderson (AU)

( * ) Notice: Subject to any disclaimer, the term of this patent is extended or adjusted under 35 U.S.C. 154(b) by 0 days.

(21) Appl. No.: 15/435,025

(22) PCT Filed: Aug. 12, 2015

(86) PCT No.: PCT/AU2015/000480
§ 371 (c)(1),
(2) Date: Feb. 16, 2017

(87) PCT Pub. No.: WO2016/025978
PCT Pub. Date: Feb. 25, 2016

(65) Prior Publication Data
US 2017/0204992 A1 Jul. 20, 2017

(30) Foreign Application Priority Data
Aug. 19, 2014 (AU) .............................. 2014903243

(51) Int. Cl.
F16L 3/10 (2006.01)
F16L 1/24 (2006.01)
E21B 17/01 (2006.01)
F16L 3/12 (2006.01)
F16L 1/15 (2006.01)

(52) U.S. Cl.
CPC .......... F16L 3/1066 (2013.01); E21B 17/012 (2013.01); E21B 17/015 (2013.01); F16L 1/24 (2013.01); F16L 3/1058 (2013.01); F16L 3/1211 (2013.01); F16L 1/15 (2013.01)

(58) Field of Classification Search
CPC ......... F16L 3/1066; F16L 1/24; F16L 3/1058; F16L 3/1211; F16L 3/08; F16L 3/10;
(Continued)

(56) References Cited

U.S. PATENT DOCUMENTS 3,722,670 A * 3/1973 Plunkett ................ B25B 27/146
206/340
5,927,491 A * 7/1999 Room ..................... F16B 15/08
206/340
(Continued)

FOREIGN PATENT DOCUMENTS

GB 2 286 649 A 8/1995
GB 2 288 205 A 10/1995
WO 2013/171521 A2 11/2013

OTHER PUBLICATIONS

International Search Report dated Sep. 14, 2015 from corresponding International Application No. PCT/AU2015/000480.
(Continued)

Primary Examiner — Christopher Garft
(74) Attorney, Agent, or Firm — Ohlandt, Greeley, Ruggiero & Perle, L.L.P.

(57) ABSTRACT

A clamp for a flexible pipe is provided that provide a load bearing flange on the flexible pipe permitting buoyancy jackets to be joined thereto. The clamp has a longitudinal axis arranged to extend along the length of the flexible pipe and a radial axis being perpendicular to the longitudinal axis. The clamp includes: a plurality of separate clamp elements being supported together in a radial array extending at least partially around the longitudinal axis; engagement means located between neighboring clamp elements to movably interconnect the clamp elements; and a strap being adapted to surround the clamp elements, in use for exerting a
(Continued)

compressive force thereon. Also provided is a clamp element for use in the aforementioned clamp.

17 Claims, 4 Drawing Sheets

(58) Field of Classification Search
CPC ..... F16L 3/12; F16L 3/137; F16L 3/14; F16L 3/1075; E21B 17/012
USPC ............. 24/279, 282; 16/234, 247, 388, 273
See application file for complete search history.

(56) References Cited

U.S. PATENT DOCUMENTS

| | | | | |
|---|---|---|---|---|
| 7,958,586 | B1* | 6/2011 | Carter | ................... B65G 69/30 119/847 |
| 2006/0150347 | A1* | 7/2006 | Pratt | ...................... A63C 19/10 14/69.5 |
| 2008/0251668 | A1 | 10/2008 | Stokes | |
| 2008/0274656 | A1 | 11/2008 | Routeau | |
| 2010/0216360 | A1* | 8/2010 | Kato | ....................... B63B 27/24 441/133 |
| 2013/0117966 | A1* | 5/2013 | Branning | ................ E05D 11/00 16/273 |
| 2014/0173856 | A1* | 6/2014 | Kingston | .................. F16L 1/24 24/285 |
| 2015/0068759 | A1* | 3/2015 | Harbison | ............... E21B 17/012 166/350 |

OTHER PUBLICATIONS

Written Opinion dated Sep. 14, 2015 from corresponding International Application No. PCT/AU2015/000480.
International Preliminary Report on Patentability dated Feb. 25, 2016 from corresponding International Application No. PCT/AU2015/000480.

* cited by examiner

CLAMP FOR A FLEXIBLE PIPE

CROSS REFERENCE TO RELATED APPLICATIONS

This application is a national stage entry of International Application No. PCT/AU2015/000480 filed Aug. 12, 2015, which claims the benefit of Australian Application No. 2014903243 filed Aug. 19, 2014, the entire contents of both of which are incorporated by reference herein.

BACKGROUND

1. Field of the Invention

The present invention relates to a clamp for a flexible pipe.

More particularly, the present invention relates to a clamp for a flexible pipe to provide a load bearing flange on the flexible pipe permitting buoyancy jackets to be joined thereto.

2. Description of Related Art

In operations involving subsea gas and oil production, there is provided a flexible pipe or umbilical, referred to as a riser, which is used to convey product, power and communications between seabed assets and the surface. The risers require a certain strength and rigidity but must also remain flexible to offset the effects of currents in the sea. As such, the risers are normally provided in the form of a multilayered product including an outer thermoplastic sleeve surrounding an internal webbing of armor steel wire. One resultant drawback is that the risers are rather heavy and place a large amount of tension on its support.

The weight of the riser can be offset by joining buoyancy jackets to the riser at selected locations. In order to prevent the buoyancy jackets from sliding upwards along the riser, clamps are attached to the riser at selected locations and the buoyancy jackets are wrapped around the clamps. It is further preferable that the clamps are able to exert sufficient force onto the riser to frictionally prevent slippage of the riser's thermoplastic sleeve over its internal webbing.

Known types of clamps consist of a few bulky C-shaped bodies forming a cylindrical aperture having an internal diameter corresponding to the external diameter of the riser, and which may be joined to each other along one side by a hinge. In use, the C-shaped bodies are positioned to encircle the riser and then clamped to the riser, either by bolting the free ends of the clamp together or by surrounding the C-shaped bodies with a compression band that is tightened.

One disadvantage of using such bulky C-shaped bodies in a clamp is that the clamp is not easily adaptable for use on risers having different diameters. Also, the clamps are relatively heavy and difficult to manufacture due to the bulkiness of the C-shaped bodies.

These above-mentioned disadvantages have been at least partially overcome by forming the clamp from a plurality of relatively small elements, which are arranged in a radial array surrounding the riser and are supported and joined together by the compression band. However, it has been found that such an array clamp can be difficult to handle due to a lack of structural definition when it is in a rest, i.e. before being mounted onto the riser, resulting from the inherent flexibility within the compression band.

It is an object of the invention to suggest a clamp for a flexible pipe, which will assist in at least partially overcoming these problems.

SUMMARY OF THE INVENTION

According to one aspect of the present invention, there is provided a clamp for a flexible pipe, the clamp having a longitudinal axis arranged to extend along the length of the flexible pipe and a radial axis being perpendicular to the longitudinal axis, the clamp comprising: a plurality of separate clamp elements being supported together in a radial array extending at least partially around the longitudinal axis; engagement means located between neighboring clamp elements to movably interconnect the clamp elements; and a strap being adapted to surround the clamp elements, in use for exerting a compressive force thereon.

Each clamp element may be wedge shaped in end view.

The wedge shape may extend through a radial arc of between 5° to 20°.

The wedge shape may extend through a radial arc of substantially 8°.

Each clamp element may have an inner face for engaging the flexible pipe, the inner face being concave, convex or planar.

The inner face may comprise an interface for increasing the compliance of the clamp element and clamp with the flexible pipe.

The interface may be a resiliently deformable strip disposed along a length of the inner face.

Each clamp element may have an outer face for engaging the strap, the outer face having a groove for receiving the strap.

The strap may be restrained against the outer face by projections extending from the outer face, under which projections opposed edges of the strap are slidably located.

Each clamp element may include opposed lateral faces, wherein the engagement means includes corresponding plug and socket formations provided on each of the lateral faces.

The plug and socket formations may be integrally formed on each of the lateral faces.

The plug and socket formations may be arranged to permit pivoting movement between neighboring clamp elements around the longitudinal axis.

The clamp may include spacer cushions provided between neighboring clamp elements.

The cushions may be resiliently deformable.

The cushions may be joined to or integrally formed with the clamp elements.

A number of discrete cushions may be provided, wherein the cushions radially straddle the engagement means.

The clamp elements may be supported together by being mounted on at least one filament.

Each clamp element may include a transverse passage for receiving the filament.

The passage may extend through the engagement means.

According to a further aspect of the present invention, there is provided a clamp element for use in the clamp as described herein.

BRIEF DESCRIPTION OF DRAWINGS

The present invention will now be described, by way of example, with reference to the accompanying drawings, in which.

DESCRIPTION OF PREFERRED EMBODIMENTS

Figure 1:
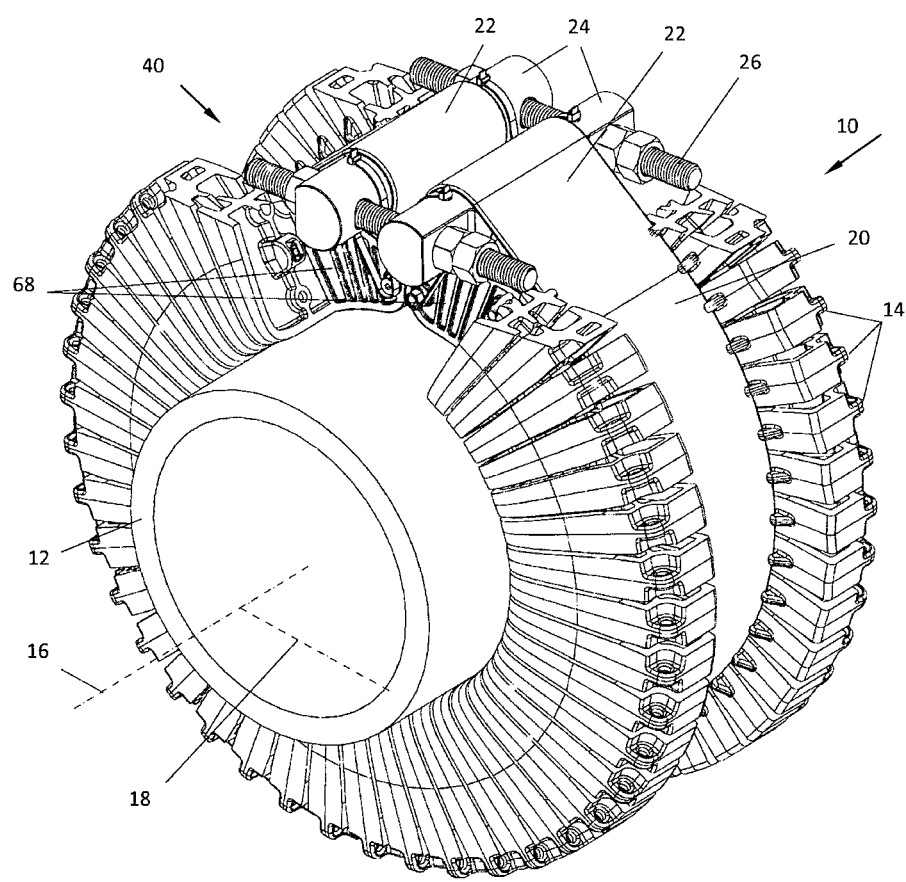
FIG. 1 is a perspective view of a clamp for a flexible pipe according to an embodiment of the invention.

Referring to FIG. 1 of the drawings, there is shown a clamp in accordance with the invention, being generally indicated by reference numeral 10. The clamp 10 is adapted to be attached to a flexible pipe or riser 12 to form and provide a load bearing flange on the riser 12, thereby enabling buoyancy jackets (not shown) to be joined to the riser 12. Although only a short section of the riser 12 is shown, the riser 12 can have any suitable length and is conventionally in the form of a cylindrical tube.

The clamp 10 is substantially ring shaped and is formed by a plurality of discrete wedge shaped clamp elements 14 that are joined together in a radial array as will be further described hereafter. Although the clamp 10 is shown as an incomplete ring extending only partially around the riser 12, additional clamp elements 14 can be added to the clamp 10 to fully close and complete the ring.

The clamp 10 has a longitudinal axis 16 arranged to extend, in use, along the length of the riser 12 and further has a radial axis 18 being perpendicular to the longitudinal axis and being arranged to coincide with a radial axis of the riser 12.

The clamp 10 includes a tension strap 20 surrounding the clamp elements 14. The strap 20 has opposed looped ends 22, through each of which extends a transverse tensioning bar 24. The bars 24 project beyond the strap 20 and can be joined to each other via their projecting ends by bolts 26. In use, the bars 24 are drawn towards each other to tighten the strap 20 around the clamp elements 14, thereby to force a non-slip frictional engagement between the clamp elements 14 and the riser 12, whereafter the bars 24 are secured together by the bolts 26 to maintain the tension within the strap 20.

Figure 2:
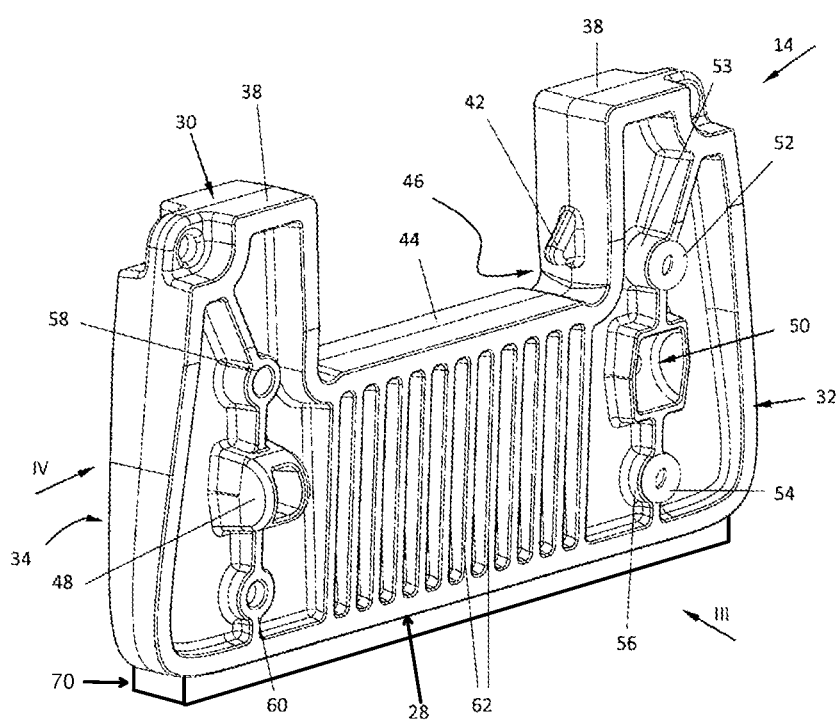
FIG. 2 is an enlarged perspective view of a clamp element of the clamp shown in FIG. 1.
Figure 3:
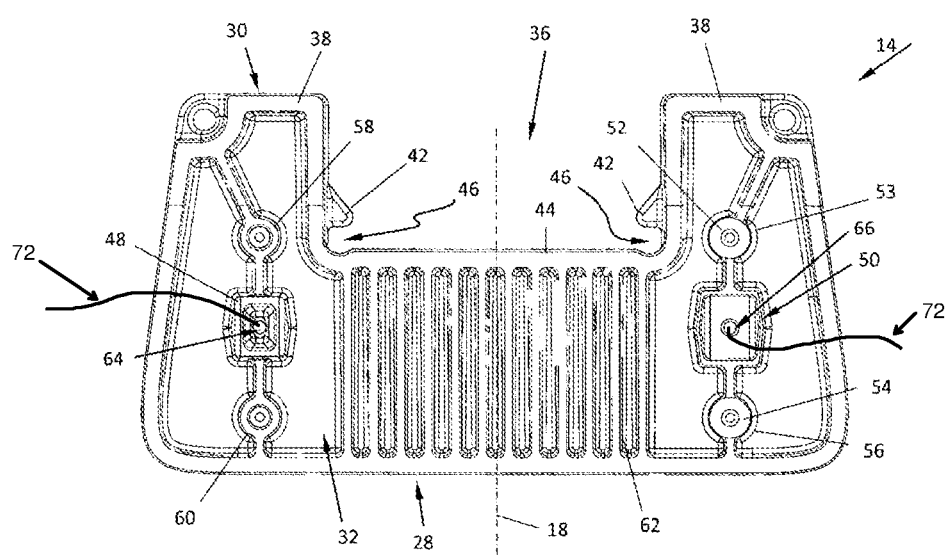
FIG. 3 is a side view of the clamp element seen along arrow III in FIG. 2.
Figure 4:
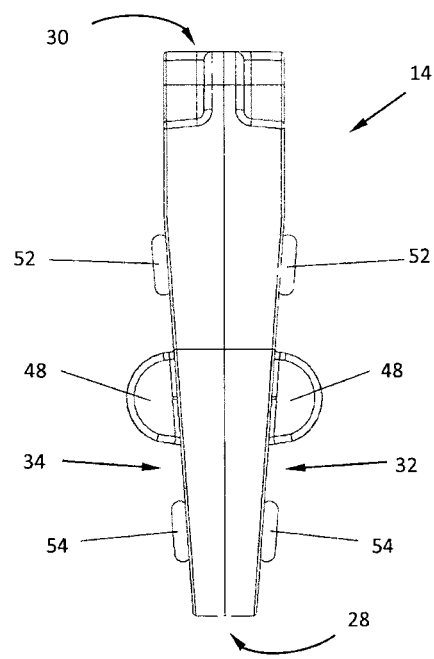
FIG. 4 is an end view of the clamp element seen along arrow IV in FIG. 2.

Referring now to FIGS. 2 to 4, there is shown an individual clamp element 14. The clamp element 14 has an inner face 28 for abutting against the riser 12 and an outer face 30 for receiving the strap 20. The clamp element 14 is wedge shaped, when seen in end view (as in FIG. 4), with the inner face 28 having a smaller width than the outer face 30. The clamp element 14 further has two lateral faces 32, 34 that are rotationally symmetrical around the radial axis 18.

Depending on the diametrical size of the clamp 10 to be assembled, the wedge shape of the clamp element 14 can extend through an arc of between 5° to 20°. In the embodiment shown, the wedge shape of the clamp element 14 extends through an arc of about 8°, i.e. being the relative angle between the opposed lateral faces 32 and 34.

The inner face 28 can be shaped to be concave, convex or planar, the selection of the appropriate shape being dependent on the specific application for the clamp 10 and the amount of pressure required to be applied to the riser 12. In accordance with a preferred embodiment of the present invention, the inner face 28 comprises an interface 70 disposed as an additional layer mounted on the inner face 28. The interface 70 comprises a deformably resilient material, preferably rubber, for increasing the compliance of the clamp element 14 and clamp 10 with the riser 12 as the riser 12 and/or underlying pipe structure, for example, bends and flexes beneath the clamp 10. It is preferred that the interface 70 is provided as a strip, comprising a quadrilateral cross-section, disposed along substantially the full length of the inner face 28.

With particular reference to FIG. 3, the outer face 30 has a central channel 36, having opposed flanges 38 on either side of the channel 36. When the clamp 10 is assembled, the respective channels 36 of neighboring clamp elements 14 cooperate to form a circumferential groove 40 (see FIG. 1) being adapted to receive the strap 20. On the opposed sides of the channel 36, tabs 42 project from either flange 38 and extend into the channel 36. The tabs 42 are spaced away from the channel floor 44 and each define a recess 46 into which the outer edges of the strap 20 can be located to assist in holding the strap 20 in place within the channel 36 and the circumferential groove 40.

The clamp element 14 further includes a plug 48 and socket 50 provided on and integrally formed with each of the lateral faces 32 and 34. The plug 48 and socket 50 are shaped corresponding to each other and are equidistantly spaced from both the inner face 28 and the radial axis 18. Thus the plug 48 on the lateral face 32 is aligned opposite to the socket 50 on the opposed lateral face 34.

In the embodiment illustrated, the plug 48 and socket 50 are centrally aligned with the flanges 38. When the clamp 10 is assembled, the plug 48 of one clamp element 14 is received into and engages with the socket 50 of its neighboring clamp element 14, and vice versa, so as to interconnect the neighboring clamp elements 14. The plug 48 and socket 50 are preferably semi-cylindrical or arc-shaped to permit a slight pivoting movement between neighboring clamp elements 14 around one axis, i.e. only relative to the longitudinal axis 16 (as seen in FIG. 1) but not relative to the radial axis 18.

In other embodiments, not illustrated in the drawings, it is envisaged that the plug 48 can be substituted for a further similar socket 50 and that an independent interconnecting member, e.g. a sphere or cylindrical disc/wheel, will be received into both the sockets 50 between the neighboring clamp elements 14. Still further, it is also envisaged that the clamp element 14 can have only a single interconnecting plug 48 and socket 50, for example lateral face 32 will have only a plug and the opposed lateral face 34 will have only a socket. In such an embodiment, the plug and socket will be aligned along the radial axis 18 (however, in such case there will no longer be rotational symmetry around the radial axis 18).

The clamp element 14 includes two spacer cushions 52, 54 respectively on each of the lateral faces 32 and 34, with the cushions standing proud of the lateral faces 32, 34. The cushions 52, 54 space the neighboring clamp elements 14 slightly apart from each other.

The cushions 52, 54 are shown being provided on the same side of the radial axis 18 as the socket 50, however, they could also be provided on the plug side of the radial axis 18. One cushion 52 is attached to a boss 53, being located between the socket 50 and the outer face 30. The other cushion 54 is attached to a boss 56 being located between the socket 50 and the inner face 28. The cushions 52, 54 thus radially straddle the socket 50 when the clamp 10 is assembled.

On the opposed side of the radial axis 18 to the cushions 52, 54 and equidistantly spaced therefrom, the clamp element 14 has abutments 58, 60 against which the cushions 52, 54 of a neighboring clamp element 1 will abut when the clamp 10 is assembled.

The cushions 52, 54 are preferably made from a resiliently compressible material. Although the cushions 52, 54 are illustrated as toroids, any other shaped cushions could also be used, for example circular.

It is envisaged that the clamp elements 14 will be made from a thermoplastics material by injection moulding. It is further envisaged that the cushions 52, 54 could be moulded together with the clamp elements 14 in a two-stage injection moulding process.

To avoid warping of the plastics material during the manufacturing process, the clamp elements 14 should preferably have a body thickness of less than 10 mm. However, such a thin body thickness reduces the structural rigidity of the clamp elements 14 and limits the amount of compression force that they can withstand, in use, being applied by the strap 20 before being crushed. Thus, a number of strengthening ribs 62 are provided on each lateral face 32, 34.

The clamp element 14 has two passages 64, 66 (see FIG. 3), one each extending centrally through the plug 48 and the socket 50 through which filaments 72 can be threaded to assemble the clamp 10. The filaments 72 are tied off onto the terminal clamp elements 14 at either end of the clamp 10. Advantageously, buttresses 68 (see FIG. 1) can be provided at the terminal ends of the clamp 10 to assist in preserving the radial alignment of clamp elements 4. In this way, the clamp elements 14 can be retained in the C-shaped form of the assembled clamp 10 with their plugs 48 and sockets 50 loosely interconnecting even before mounting on the riser 12.

The filaments 72 will be tied in such a manner permitting the clamp elements 14 to move relative to each other by rotation around the plugs 48 and by corresponding compression of the cushions 52, 54. Thereby the terminal ends of the clamp 10 can be parted sufficiently to allow the clamp 10 to be mounted onto the riser 12. By the clamp elements 14 pivoting around the interconnecting cylindrical plugs 48 and sockets 50, the cushions 54 are compressed and cushions 52 allowed to expand to open the clamp 10 sufficiently to permit it to be mounted onto the riser 12, but without the plugs 48 disengaging from the sockets 50. The filaments 72 may further be tied in such a manner that a tensile load is applied, reacted by a corresponding compressive load in the cushions 52, 54. The compressive force provides an even spacing between the clamp elements 14, and further assists with maintaining the C-shaped form of the clamp 10.

The combination of forces may be such that sufficient movement in either direction is permitted, to allow the clamp 10 to open for fitment to the riser 12, or to allow contraction of the diameter upon tightening of the strap 20.

Following the mounting of the claim 10 onto the riser 12, the strap 20 is attached and tightened, which reduces the radial size of the clamp 10 so that it immovably locks onto the riser 12. The radial size of the clamp 10 is reduced both by pulling the terminal ends of the clamp 10 closer to each other and also by compressing the cushions 52, 54 to reduce the spacing between neighboring clamp elements 14.

In a further embodiment, it is envisaged that the cushions 52, 54 could be rigid members capable of being destructively crushed during tightening of the strap 20.

Modifications and variations as would be apparent to a skilled addressee are deemed to be within the scope of the present invention.

The invention claimed is:

1. A clamp for a flexible pipe, the clamp comprising:
 a longitudinal axis arranged to extend along a length of the flexible pipe;
 a radial axis perpendicular to the longitudinal axis;
 a plurality of separate clamp elements each having a closed transverse passage, the plurality of separate clamp elements being supported together in a radial array by a filament extending through the closed transverse passage and at least partially around the longitudinal axis;
 an engagement device located between neighboring clamp elements of the plurality of separate clamp elements to movably interconnect the neighboring clamp elements; and
 a strap adapted to surround the plurality of separate clamp elements, in use for exerting a compressive force thereon,
 wherein each clamp element comprises lateral faces, and
 wherein the engagement device comprises plug and socket formations provided on each of the lateral faces.

2. The clamp according to claim 1, wherein each clamp element of the plurality of separate clamp elements is wedge shaped in end view.

3. The clamp according to claim 2, wherein the wedge shape extends through a radial arc of between 5° to 20°.

4. The clamp according to claim 2, wherein the wedge shape extends through a radial arc of 8°.

5. The clamp according to claim 1, wherein each clamp element comprises an inner face for engaging the flexible pipe.

6. The clamp according to claim 5, wherein the inner face comprises an interface for increasing the compliance of the clamp element and clamp with the flexible pipe.

7. The clamp according to claim 6, wherein the interface is a resiliently deformable strip disposed along a length of the inner face.

8. The clamp according to claim 5, wherein the inner face is planar.

9. The clamp according to claim 1, wherein each clamp element comprises an outer face for engaging the strap, the outer face having a groove for receiving the strap.

10. The clamp according to claim 9, wherein the strap is restrainable against the outer face by projections extending from the outer face, under which projections opposed edges of the strap are slidably located.

11. The clamp according to claim 1, wherein the closed transverse passage extends through the engagement device.

12. The clamp according to claim 1, wherein the plug and socket formations are arranged to permit pivoting movement around the longitudinal axis between the neighboring clamp elements.

13. The clamp according to claim 1, further comprising a spacer cushion provided between the neighboring clamp elements.

14. The clamp according to claim 13, wherein the cushion is resiliently deformable.

15. The clamp according to claim 13, wherein the cushion is joined to the clamp elements.

16. The clamp according to claim 13, wherein the cushion is integrally formed with the clamp elements.

17. The clamp according to claim 13, wherein the cushion comprises a number of discrete cushions, and the number of discrete cushions radially straddle the engagement device.

* * * * *